United States Patent Office 3,472,777
Patented Oct. 14, 1969

3,472,777
FERROELECTRIC CERAMIC COMPOSITIONS
Lothar H. Brixner, West Chester, Pa., assignor to E. I. du Pont de Nemours and Company, Wilmington, Del., a corporation of Delaware
No Drawing. Filed July 28, 1967, Ser. No. 656,680
Int. Cl. C04b 35/00, 35/46; H01v 7/02
U.S. Cl. 252—62.9                                4 Claims

ABSTRACT OF THE DISCLOSURE

Ferroelectric ceramic compositions derived from the well-known perovskite crystal structure $ABO_3$ have the generic formula $AMg_{1/3}Ti_{1/3}W_{1/3}O_3$, where A is Pb for which partial substitution may be made by (1) from 0.1 to 0.8 mole of Sr, or (2) from 0.1 to 0.3 mole of Y with electroneutrality restored by introduction of ions of Nb or Ta in substitution for ions of W.

BACKGROUND OF THE INVENTION

Ferroelectric compositions based on the crystal structure of perovskite are known in the art, and many of the substituted-perovskite crystals have been found to be quite valuable as piezoelectric ceramics, such as, for example, lead zirconate-titanate as described and claimed in U.S. 2,708,244, and lead zirconate-titanate-stannate as in U.S. 2,849,404. However, substitutions in A and B sites of the crystal of generic formula $ABO_3$ comprising the elements disclosed in the present invention and in the amounts specified, with ion-compensation by Nb or Ta where necessary to attain electroneutrality, is not disclosed nor suggested.

SUMMARY OF THE INVENTION

In accordance with the present invention a novel and useful ferroelectric ceramic composition of the crystalline perovskite $ABO_3$ structure in which A is lead, and B comprises ⅓ mole each of magnesium, titanium, and tungsten is provided. The compositions are single-phase tetragonally distorted crystals, ferroelectric at room temperature, and susceptible of electrostatic polarization. They exhibit, when polarized, electromechanical transducing properties as a result of their piezoelectric character. Modification of the basic crystal composition, $$PbMg_{1/3}Ti_{1/3}W_{1/3}O_3$$

within the rules of isomorphic substitution and maintenance of electroneutrality by appropriate valence compensation, is possible by introduction of (1) from 0.1 to 0.8 mole of Sr per mole of lead; or (2) by introduction of from 0.1 to 0.3 mole of yttrium per mole of lead, with the necessary electroneutrality re-established in this case by introduction of appropriate amounts of niobium or tantalum in substitution for ions of tungsten.

The compositions of this invention are prepared by standard ceramic techniques comprising, in order, the steps of weighing, mixing, prefiring, ball-milling, pressing, and final firing of the required metal oxide or its precursor. The ceramic discs which are prepared by these steps are fitted with firmly-attached electrodes of Ag, Au, Pd, or Pt and tested for electrical properties.

The following examples describe in detail the preparation and testing of the ferroelectric ceramic compositions of this invention. They are cited to illustrate the invention and not to limit it in any manner.

Example 1

The following reactants are weighed to the nearest $\frac{1}{10}$ mg. and blended:

|  | G. |
|---|---|
| $PbCO_3$ | 10.0333 |
| $MgO$ | 0.5046 |
| $TiO_2$ | 1.0000 |
| $WO_3$ | 2.9017 |

The powder blend is fired at 800° C. for 8 hours in air. The reaction product is ball-milled under acetone in a mechanical agate mill to insure complete homogenization, and pellets of ½ to 1″ diameter are pressed from the ground material using 15,000 p.s.i. The pellets are fired at 1050° C. for 2 hours and the resulting strong ceramic discs are polished true and paralled before electrodes are attached.

A piece of the disc resulting from the final firing is examined by X-ray analysis. The material is found to be single-phase, with no lines indicating the constituent components to be present. The formula of the composition may therefore be written $PbMg_{1/3}Ti_{1/3}W_{1/3}O_3$.

The lattice parameters are as follows:

$a_t = 3.912$ A.
$c_t = 3.994$ A.
$c/a = 1.02$
crystal volume = 61.123 A.$_3$
X-ray density = 9.252 g. ml.$^{-1}$ For comparison, to indicate the degree of non-centrosymmetric tetragonal distortion exhibited by this crystal, the well-known ferroelectric $BaTiO_3$ shows a $c/a$ ratio of 1.01, and the equally well known ferroelectric $PbTiO_3$ has a $c/a$ ratio of 1.04.

The dielectric constant of this material is 1445 at 1 kHz. (kilohertz). Ferroelectricity is established by observing the E–D hysteresis loop in a loop tracer. Saturation polarization and remanent polarization of 2.45 and 1.31 microcoulomb/cm.$^2$ respectively are observed at 60 Hz. with a sweep-to-peak voltage of 2500 v.

Examples 2–6

In the same manner as given in Example 1, the steps of weighing, mixing, prefiring, ball-milling, pressing, and final firing are carried out to prepare samples in which strontium substitution is effected for a portion of the lead in the generic formula $PbMg_{1/3}Ti_{1/3}W_{1/3}O_3$. Samples are prepared of crystals of the structure $$Pb_{1-x}Sr_xHg_{1/3}Ti_{1/3}W_{1/3}O_3$$

with $x$ having a value of from 0.1 to 0.8. The ceramic discs are prepared using the amounts of oxides or carbonates shown in the following Table I. The discs are fitted with electrodes and tested for electrical properties. The dielectric constants at room temperature are given as $K_{RT}$.

TABLE I.—Sr-SUBSTITUTION

[$Pb_{1-y}Sr_xMg_{1/3}Ti_{1/3}W_{1/3}O_3$]

| Example | x | $PbCO_3$ | $SrCO_3$ | MgO | $TiO_2$ | $WO_3$ | $K_{RT}$ |
|---|---|---|---|---|---|---|---|
| 2 | 0.1 | 9.3360 | 0.5730 | 0.5217 | 1.0338 | 3.0000 | 1,958 |
| 3 | 0.2 | 8.2989 | 1.1463 | 0.5217 | 1.0338 | 3.0000 | 1,143 |
| 4 | 0.4 | 6.2231 | 2.2926 | 0.5217 | 1.0338 | 3.0000 | 790 |
| 5 | 0.6 | 4.1493 | 3.4449 | 0.5217 | 1.0338 | 3.0000 | 352 |
| 6 | 0.8 | 2.0748 | 4.5849 | 0.5217 | 1.0338 | 3.0000 | 191 |

Examples 7-11

Compacts of composition $$Pb_{1-x}Y_xW_{1/3-x}Nb_xMg_{1/3}Ti_{1/3}O_3$$

were prepared according to the same procedure as given in the previous examples, using the amounts of oxides and carbonates as given in Table II. These compacts are tested in the same manner as given above and the dielectric constants are found as given in Table II.

TABLE II.—Y-SUBSTITUTION
$[Pb_{1-x}Y_xW_{1/3-x}Nb_xMg_{1/3}Ti_{1/3}O_3]$

| Example | x | $Y_2O_3$ | $PbCO_3$ | $WO_3$ | $Nb_2O_5$ | MgO | $TiO_2$ | $K_{RT}$ |
|---|---|---|---|---|---|---|---|---|
| 8  | 0.1  | 0.4695 | 10.0000 | 2.2560 | 0.5530 | 0.5590 | 1.1070 | 1,806 |
| 9  | 0.15 | 0.7460 | 10.0000 | 1.6640 | 0.8780 | 0.5920 | 1.1730 | 1,256 |
| 10 | 0.20 | 1.0560 | 10.0000 | 1.4420 | 1.2430 | 0.6270 | 1.2460 | 1,022 |
| 11 | 0.25 | 1.4090 | 10.0000 | 0.7290 | 1.6580 | 0.6710 | 1.3290 | 788 |
| 12 | 0.30 | 1.8110 | 10.0000 | 0.4090 | 2.1320 | 0.7190 | 1.4240 | 556 |

UTILITY

The compositions of this invention may be employed wherever electromechanical transduction is required, for instance, as a phonograph cartridge and as a frequency filter in a radio circuit; because of its high dielectric constant it may be used as a high capacitance capacitor.

Many equivalent modifications will be apparent to those skilled in the art from a reading of the above without a departure from the inventive concept.

What is claimed is:

1. Ferroelectric ceramic compositions of the perovskite crystal structure having the generic formula $$AMg_{1/3}Ti_{1/3}W_{1/3}O_3$$

where A is Pb for which partial substitution has been made by an element selected from the group consisting of strontium and yttrium, within the following further limitations: (1) when strontium is used in partial substitution for lead, it may be substituted in an amount of from 0.1 to 0.8 mole per mole of lead and (2) when ytrrium is used in partial substitution for Pb it may be substituted in an amount of from 0.1 to 0.3 mole per mole of lead, with electroneutrality restored by the introduction of ions of Nb or Ta in substitution for ions of tungsten.

2. Ferroelectric ceramic compositions of the perovskite crystal structure of formula $Pb_{1-x}Sr_xMg_{1/3}Ti_{1/3}W_{1/3}O_3$ in which $x$ has a value of 0.1 to 0.2 inclusive.

3. Ferroelectric ceramic compositions of the perovskite crystal structure of formula $$Pb_{1-x}Y_xW_{1/3-x}Nb_xMg_{1/3}Ti_{1/3}O_3$$

in which $x$ has a value of 0.1 to 0.2 inclusive.

4. A process for the preparation of a ferroelectric ceramic composition of claim 1, which comprises the steps of (1) weighing and thoroughly mixing stoichiometric quantities selected from the group consisting of the oxides of the metals required and oxygen-containing compounds of these metals which upon heating will form the oxides; (2) firing the blended mixture for from 8–14 hours at a temperature of from 800–1200° C.; (3) ball milling the first-fired product and pressing to form a ceramic disc, and (4) subjecting said disc to a final firing of from 1–4 hours at a temperature of about 800–1200° C.

References Cited

UNITED STATES PATENTS 3,268,783   8/1966   Saburi _____ 106—39 X

OTHER REFERENCES

Smolenskii et al.: "Soviet Physics-Solid State," vol. 3, No. 3, September 1961.

TOBIAS E. LEVOW, Primary Examiner

J. COOPER, Assistant Examiner

U.S. Cl. X.R.

106—39